United States Patent Office.

JOHN F. BERNARD, OF LEOMINSTER, MASSACHUSETTS.

Letters Patent No. 69,165, dated September 24, 1867.

---

IMPROVED COMPOSITION FOR FILLING THE PORES OF WOOD.

---

*The Schedule referred to in these Letters Patent and making part of the same.*

---

TO ALL WHOM IT MAY CONCERN:

Be it known that I, JOHN F. BERNARD, of Leominster, in the county of Worcester, and State of Massachusetts, have invented an Improved Composition for Filling the Pores of Black Walnut and other Woods previous to varnishing or polishing the same; and I hereby declare the following to be a full, clear, and exact description thereof.

This invention consists in an improved composition for filling the pores of wood previous to polishing or varnishing the same, by the use of which the process of filling the pores is rendered much less tedious and expensive than heretofore.

To enable others skilled in the art to understand and use my invention, I will proceed to describe the manner in which I have carried it out.

Take one pint of asphaltum varnish, one quart of boiled linseed oil, one quart of spirits of turpentine, and place them in a suitable vessel, then add one pound of French yellow, two pounds of whiting, two pounds of plaster of Paris, one half pound of Vandyke brown, and one and one-half pound of pumice-stone. The whole is then stirred until the several ingredients are thoroughly incorporated together, when it is ready for use.

The quantity of Vandyke brown may be varied according to the color desired for the composition, and when it is to be used on chestnut or other light-colored wood, the Vandyke brown should be omitted entirely, and the quantity of asphaltum varnish reduced one-half. The proportions of the other ingredients may also be varied slightly without departing from the spirit of my invention. Those above mentioned, however, I have found to answer well.

One coat only of the above-described composition is required, which is laid on with a brush. It is then left until it sets into a paste, when it is to be rubbed off with a piece of cloth, and about two hours thereafter the surface of the wood is ready to be polished or varnished, the pores having been entirely filled, as required.

By filling the pores of wood with the above-described composition, instead of putting on one or more coats of varnish, and scraping and rubbing it down, as has heretofore been customary, a great saving is effected, as the cost of the composition is very much less than that of varnish, and very little time is required to prepare the surface of the wood to receive the polish.

*Claim.*

What I claim as my invention, and desire to secure by Letters Patent, is—

The within-described composition, made of the ingredients set forth, and mixed together, substantially in the manner and for the purpose specified.

JOHN F. BERNARD.

Witnesses:
   N. W. STEARNS,
   W. J. CAMBRIDGE.